Patented Nov. 11, 1930

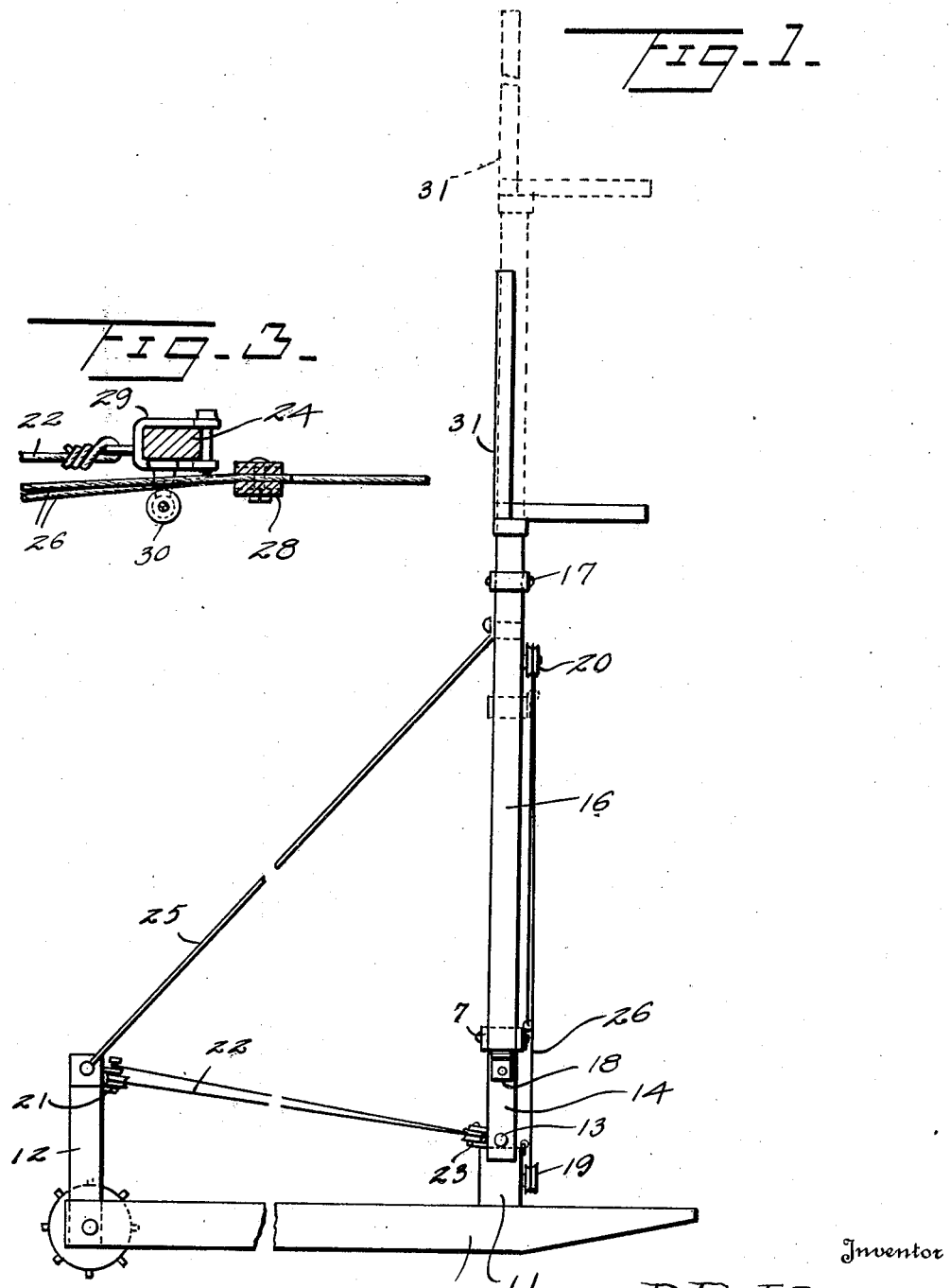

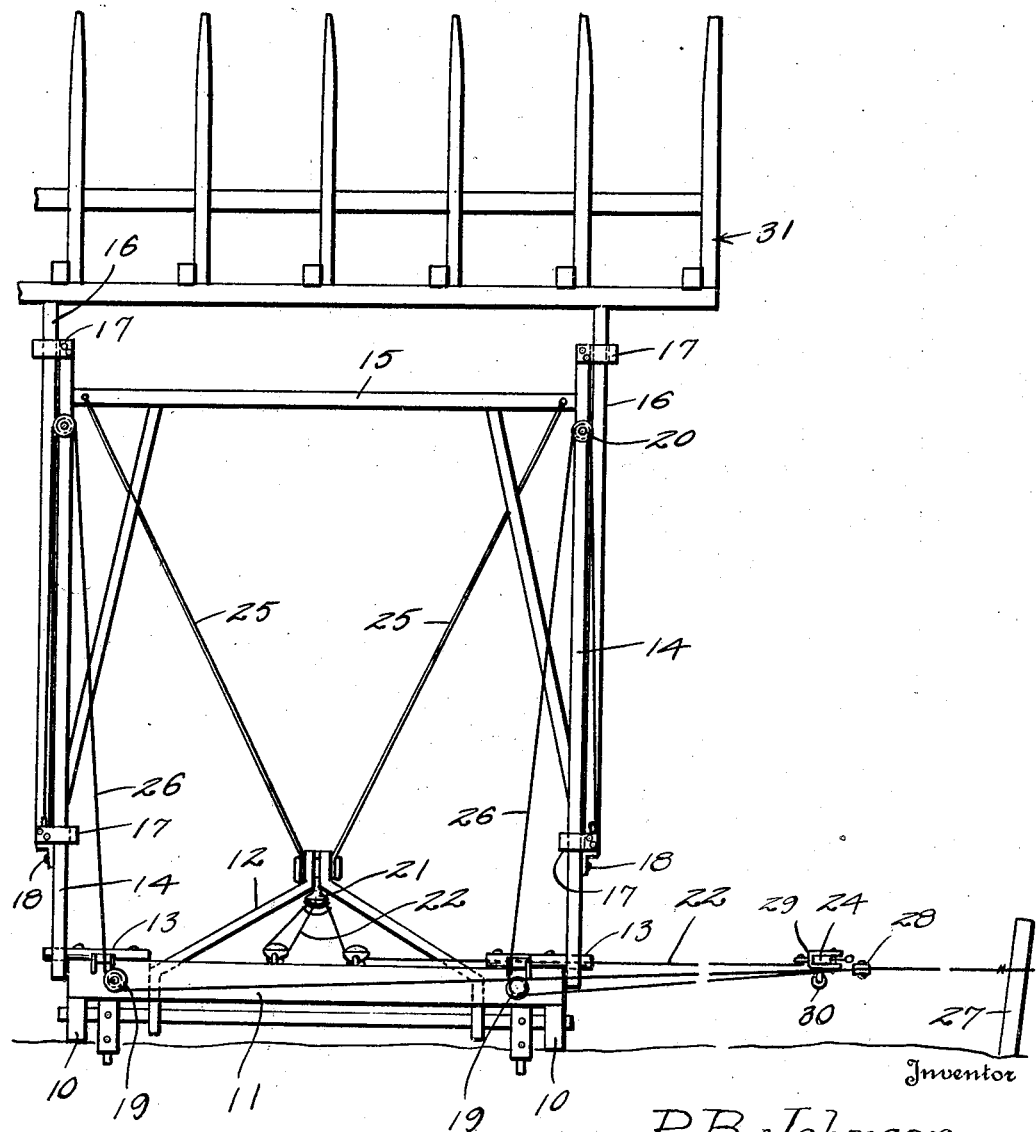

1,780,925

UNITED STATES PATENT OFFICE

PETER B. JOHNSON, OF FREMONT, NEBRASKA

STACKER

Application filed February 4, 1929. Serial No. 337,381.

This invention relates to new and useful improvements in stackers, and particularly to hay stackers.

One object of the present invention is to provide a stacker which is adapted to be automatically extended, when it has been elevated into a predetermined angular position.

Another object is to provide a stacker of this character which is equipped with means for elevating the same, and wherein such elevating means actuates certain other means to cause the stacker to be extended, whereby to more effectively deposit its load onto the stack, in accordance with the increase in height of the stack.

Other objects and advantages will be apparent from the following description when taken in connection with the accompanying drawings.

In the drawings:

Figure 1 is a side elevation of a stacker made in accordance with the present invention, and shown in elevated position, prior to the operation of the extending means, dotted lines showing the device extended.

Figure 2 is a rear elevation of the same, in the position shown in Figure 1, and showing the means which operates to extend the stacker when it has been elevated to the predetermined angle.

Figure 3 is a sectional detail of the draft means.

Referring particularly to the accompanying drawings, there is shown a base including the runner members 10, the transverse sill 11, and the vertically extending triangular frame 12. Carried by each end of the sill is an outwardly extending stub shaft 13, and pivotally supported on each of said shafts is the inner end of a vertically swinging arm 14, said arms being connected together, adjacent their outer ends, by means of the cross bar 15. Slidably disposed on each of the arms 14 is an auxiliary arm 16, the same being connected to the arms 14 by means of the rings or bands 17, which embrace the arms 14 and 16. Each of the arms 14, adjacent its inner end, is provided with a stop block 18, against which the inner of the rings or bands 17 engage to limit the inward movement of the outer slidable arms 16. Mounted on each end of the sill 11 is a pulley 19, and mounted on the outer end of each of the arms 14 is a similar pulley 20. Mounted on the forward ends of the runners 10, and rising therefrom, is before-mentioned triangular frame 12, and carried by the upper end of said frame is a pulley block 21, having a cable 22 secured thereto and engaged around its pulley, and thence downwardly around the pulleys 23, mounted on the said sill 11. The cable 22 extends outwardly from one side of the frame of the device and carries on its outer end a draft device 24, to which draft animals are adapted to be hitched. Connected to the upper end of the frame 12, and to the outer ends of the cross bar 15, are the lifting cables 25, which serve to swing the arms 14 and 16 upwardly, when the frame 12 is pulled by means of the cable 22. Secured to the inner end of each of the arms 16 is one end of a cable 26, said cable passing over one of the pulleys 20, thence inwardly around one of the pulleys 19, and outwardly to a point a suitable distance from the side of the device, where they are connected together, and to a stake 27, driven in the ground. Carried by the cables 22, at a suitable point between the stacker frame, and the stake 27, is a clamp 28, which connects the cables 22 together. On the draft means 24 is mounted a clevis 29, and carried by said clevis is a pulley 30 through which the cables 22 pass. On the outer ends of the arms 16 is mounted a tiltable rake member 31, which is adapted to receive hay collected by the ordinary sweep rake, and when said rake 31 is sufficiently loaded, the operator causes the draft animals to pull on the cable 22, whereby to swing the arms 14 and 16 upwardly until they reach a predetermined angle with relation to the ground, at which time the pulley 30 strikes the clamp 28, exerting a pull on the cables 26, whereby to slide the arms 16 outwardly, with respect to the arms 14, whereby to permit the stacker rake member 31 to be elevated to the proper height to deposit its load of hay on the top of the stack. Upon backing the animals until the pulley 30 is out of engagement with the clamp 28, the arms 16, together with the rake member 31, will slide inwardly to their normal position, while at the same time the arms are manipulated so to that the same will swing away from the stack, and again assume a position on the ground, ready for a new load of hay from the sweep rakes.

It will thus be seen that the operation of the cable 22, by the draft animals serves initially to elevate the stacker to a certain position, and subsequently to extend the stacker arms so that the load may be deposited at the proper position on the top of the stack.

What is claimed is:

1. A stacker including a support, a vertically swingable stacker frame on the support having an outer extensible section, a cable operatively connected with the extensible section and with a stationary means adjacent the support, a stop means on said cable, a cable for swinging the stacker frame, and draft means for drawing the last-named cable to elevate the stacker frame and to engage with said stop to draw the second-named cable to raise the extensible section.

2. A stacker including a support, a vertical swingable stacker frame on the support, an extensible frame on the stacker frame, a cable connected with the extensible frame and with a stationary means adjacent said support, a cable connected with the stacker frame for elevation thereof, a stop means on the first cable, and a draft means on the second cable slidably supported by the first cable and arranged to engage said stop whereby to pull the first cable and extend the extensible frame.

In testimony whereof, I affix my signature.

PETER B. JOHNSON.